(12) United States Patent
Saito et al.

(10) Patent No.: US 6,715,142 B1
(45) Date of Patent: Mar. 30, 2004

(54) EXECUTION PROGRAM GENERATION METHOD, EXECUTION PROGRAM GENERATION APPARATUS, EXECUTION PROGRAM EXECUTION METHOD, AND COMPUTER-READABLE STORAGE MEDIUM

(75) Inventors: Kazuo Saito, Nakai-machi (JP); Mitsuhisa Kamei, Nakai-machi (JP); Hiroyuki Ishima, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 488 days.

(21) Appl. No.: 09/655,064

(22) Filed: Sep. 5, 2000

(30) Foreign Application Priority Data

Dec. 21, 1999 (JP) .......................... 11-362044

(51) Int. Cl.[7] .............................................. G06F 9/45
(52) U.S. Cl. ...................................................... 717/159
(58) Field of Search ........................ 717/106, 159–161, 717/140–151; 711/165–166, 170–173; 712/208–213; 713/1–2; 704/2–9

(56) References Cited

U.S. PATENT DOCUMENTS

| | | | | |
|---|---|---|---|---|
| 4,281,215 A | * | 7/1981 | Atalla ........................ | 705/72 |
| 5,867,603 A | * | 2/1999 | Barnsley et al. ............ | 382/249 |
| 6,097,838 A | * | 8/2000 | Klassen et al. ............. | 382/167 |
| 6,199,126 B1 | * | 3/2001 | Auerbach et al. ............ | 710/68 |
| 6,199,203 B1 | * | 3/2001 | Saboff ........................ | 717/168 |
| 6,205,580 B1 | * | 3/2001 | Hirose ........................ | 717/162 |
| 6,295,647 B1 | * | 9/2001 | Ramaswamy ............... | 725/116 |
| 6,446,258 B1 | * | 9/2002 | McKinsey et al. .......... | 717/161 |
| 6,473,840 B2 | * | 10/2002 | Matthews et al. ........... | 711/154 |
| 6,496,910 B1 | * | 12/2002 | Baentsch et al. ............ | 711/165 |
| 6,505,295 B1 | * | 1/2003 | Hiraki et al. ................ | 712/241 |

OTHER PUBLICATIONS

"Java!", Tim Richey, pp. 326–343, Sep. 22, 1995.*

* cited by examiner

*Primary Examiner*—John Chavis
*Assistant Examiner*—Lawrence Shrader
(74) *Attorney, Agent, or Firm*—Oliff & Berridge, PLC

(57) ABSTRACT

An execution program including encoded code portions is executed on an operating system inhibiting the rewriting of program code area. The execution program includes encoding target code and code not encoded. Immediately before executing the encoding target code, the encoding targets code is decoded and relocation processing is performed for the encoding target code. Immediately after starting the encoding target code, the encoding target code is not decoded. When the program execution has proceeded to the stage in which to execute the encoding target code, an area for decoding the encoding target code is allocated, and then the encoding target code is decoded within the area and thus relocated.

20 Claims, 8 Drawing Sheets

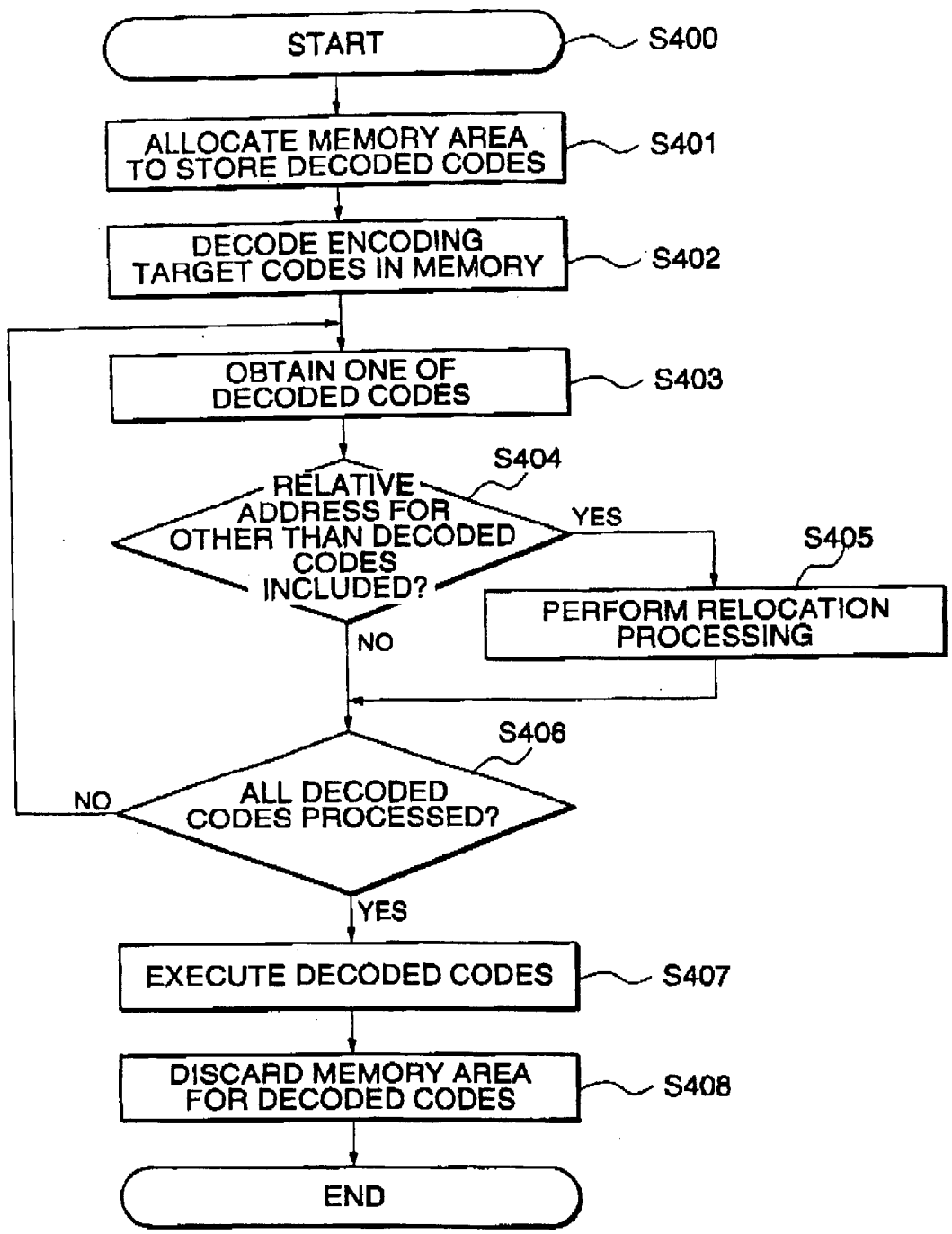

EXECUTION PROGRAM GENERATION METHOD, EXECUTION PROGRAM GENERATION APPARATUS, EXECUTION PROGRAM EXECUTION METHOD, AND COMPUTER-READABLE STORAGE MEDIUM

BACKGROUND OF THE INVENTION

1. Field of the Invention

The present invention relates to a relocation technique for relocating address information in a program when loading program codes executed on a computer system into a memory, and more particularly to a relocation technique for optimally relocating, during execution, execution program codes partially including encoded code portions and configured so as not to be decoded until their execution is required.

More particularly, the present invention relates to a relocation technique which enables programs including encoded code portions and configured so as not to be decoded until their execution is required to be generated using general purpose compilers.

2. Description of the Prior Art

With recent developments in technical innovation, various types of information processing apparatuses such as workstations and general purpose computers (PC) are being developed and are put on the market. The basic structures of such information processing apparatuses are a processor and a main memory. That is, the processor executes program codes loaded into the main memory and writes the work data to a work area of the main memory. The processor generally executes various types of program codes under control of an operating system (OS).

One of methods of deciding locations or memory addresses on the main memory into which the program codes are loaded is absolute addressing. The absolute addressing uniquely decides memory addresses in a certain unit such as hardware, process, and job. When programs using the absolute addressing are started, if the programs cannot be allocated to intended addresses, the rewriting or relocation of address information in the programs is required. Some operating systems mandatorily perform relocation each time a program is started, without in advance deciding program allocation addresses.

On the other hand, relative addressing (also referred to as PC relative addressing or the like) is available as a method of specifying memory addresses. The relative addressing specifies memory addresses by differences from the address of an instruction currently being executed. Use of the relative addressing eliminates the need to specify absolute addresses to transfer execution control to specific addresses or access memory contents stored at specific address. Therefore, program codes represented by the relative addressing can be executed without performing relocation processing even if they are allocated to any memory addresses, so that the relocation processing is not required as a rule. In a word, start processing can be eased. Therefore, some operating systems assume that program codes are represented by relative addresses.

There is a recent trend toward compressing program codes to reduce a storage capacity necessary to store programs, encrypting program codes to prevent illegal use by analysis and tampering, or encoding program codes for other purposes.

Where an entire program is collectively encoded, if processing is left to a loader of an operating system after program codes have been temporarily decoded during program execution, normal execution of the program can be guaranteed.

On the other hand, some techniques apply encoding not to an entire program but to only part thereof. For example, for a large program size, if the entire program were compressed, a long time would be required for decompression processing at start time. Therefore, the program is compressed only partially and decompressed for execution as required after start. This makes the start of the program faster, compared with the method of compressing the entire program. Also, this method has the advantage that total processing time is reduced, since compressed portions need not be decompressed if they need not be executed. Alternatively, by partially encrypting programs and configuring them so that encrypted portions are not decoded until their execution is actually required, illegal use of the programs by analysis and tampering can be satisfactorily prevented.

However, some types of operating systems disable the rewriting of execution program codes during execution for the following reason.

1. Recently, computer viruses cause a big public concern. Some types of computer viruses cause infection upon rewriting of program codes during program execution. To prevent the infection of such types of viruses, the rewriting of program codes during execution is inhibited.
2. When a single program is started more than once, in terns of use efficiency of computer resources such as memory, it is desirable to share single program codes among programs individually started. On the assumption that programs are rewritten during execution, for example, while one program is performing rewriting, if another program initiates rewriting, program mismatch would occur and a facility for preventing the mismatch would be very complicated, with the result that the processing efficiency of the operating system is reduced. Accordingly, the inhibition of rewriting during program execution eliminates provisions for such mismatch and simplifies the mechanism of the operating system.

In other words, there is the problem that, in a type of operating system inhibiting the rewriting of program codes during execution, programs cannot be configured so that they are partially compressed or encrypted and are decompressed or decoded as required during execution.

On the other hand, several operating systems provide system call functions for executing instruction code strings generated on a data area, that is, for changing the attributes of a memory area (readable, writable, executable, etc.) or maintaining compatibility with CPU cache. Win32 API supported by the Microsoft's operating system Windows provides VirtualProtect() and FinishInstructionCache() system call functions, the United States Apple Computer's operating system MacOS provides a MakeDataExecutable() system call function, and UNIX family operating system Linux provides an mprotect() system call function. Use of these functions makes it possible to execute instruction code strings in a data area. Since the data area can be freely modified during execution, as an area for decoding an encoded code area, it may be allocated in a data memory area different from a program code area so that decoding is performed within the area and decoded codes are executed within the area.

However, if a code area to be encoded contains an instruction to transfer execution control to a specific address outside the code area or to access memory contents stored at a specific address, since address information of the instruction code is represented by a value (difference) relative to a calling destination or memory reference destination, an address change in the code area entails a change in relative address information, so that normal execution would be disabled without some processing.

In short, in execution programs including encoded code portions and configured so as not to be decoded until their execution is required, if a code area to be encoded contains an instruction to transfer execution control to a specific address outside the code area or to access memory contents sorted at a specific address, with techniques having been heretofore disclosed, satisfactory execution is impossible on operating systems inhibiting the rewriting of a program code area.

Furthermore, programs having such a function, even if implemented, could not be generated by conventional general purpose compilers. In other words, to generate such programs requires the designing of a special compiler, leading to enormous costs.

SUMMARY OF THE INVENTION

The present invention provides a technique that enables execution programs including encoded code portions and configured so as not to be decoded until their execution is required to be satisfactorily executed even on operating systems inhibiting the rewriting of a program code area.

The present invention provides programs that are partially encoded on an operating system inhibiting the rewriting of a program code area and can be normally executed with the encoded portions decoded after the programs are started.

The present invention provides a technique that enables programs including encoded code portions and configured so as not to be decoded until their execution is required to be generated using a general purpose compiler.

The present invention has been made in view of the above problems, and a first aspect of the present invention is a method for generating an execution program of a type that includes the encoding target codes to be encoded in part of program codes thereof, the method including the steps of: (a) encoding the encoding target codes; (b) allocating a memory area for decoding the encoded encoding target codes and providing a decoding execution code portion for decoding the encoded encoding target codes in the allocated area to the execution program; and (c) providing a relocation execution code portion for performing relocation processing for the decoded encoding target codes to the execution program.

A second aspect of the present invention is a method for generating an execution program of a type that includes the encoding target codes to be encoded in part of program codes thereof, the method including the steps of:

(a) generating relocation information of the encoding target codes;

(b) encoding the encoding target codes;

(c) providing a decoding execution code portion for allocating a memory area for decoding the encoded encoding target codes and decoding the encoded encoding target codes in the allocated area to the execution program; and (d) providing a relocation execution code portion for performing relocation processing for the decoded encoding target codes using the generated relocation information to the execution program.

In the execution program generation method according to the first or second aspect of the present invention, the encoding may be compression processing and the decoding may be decompression processing for compressed data. Or the encoding may be encryption processing and the decoding may be decryption processing for encrypted data.

A third aspect of the present invention is a method for generating an execution program of a type that includes the encoding target codes to be subjected to compression processing in part of an execution code section thereof, the method including the steps of: (a) compressing the encoding target codes; (b) forwardly shifting the area of the execution code section and following sections by the size of a space vacated by compressing the encoding target codes; (c) allocating a memory area for decompressing the compressed encoding target codes and providing a decoding execution code portion for decompressing the compressed encoding target codes in the allocated area to the execution program; and (d) inserting a relocation execution code portion for relocating the decoded encoding target codes to the execution code section.

A fourth aspect of the present invention is a method for generating an execution program of a type that includes the encoding target codes to be subjected to compression processing in part of an execution code section thereof, the method including the steps of: (a) generating relocation information of the encoding target codes; (b) compressing the encoding target codes; (c) forwardly shifting the area of the execution code section and following sections by the size of an area vacated by compressing the encoding target codes; (d) allocating a memory area for decompressing the compressed encoding target codes and providing a decoding execution code portion for decompressing the compressed encoding target codes in the allocated area to the execution program; and (e) inserting a relocation execution code portion for relocating the decoded encoding target codes using the generated relocation information to the execution code section.

In the execution program generation methods according to the first, second, third, and fourth aspects of the present invention, the decoding execution code portion and the relocation execution code portion may be applied to the encoding target codes at the first execution of the encoding target codes after the execution program is loaded into the memory.

A fifth aspect of the present invention is an apparatus that generates an execution program of a type that includes the encoding target codes to be encoded in part of program codes thereof, the apparatus including: (a) a compiler for translating coded source program codes of high-level language format into object program codes; (b) an encoding target code detection unit for determining a range to be encoded in the coded program codes; (c) an encoding processing unit for encoding codes in the encoding target range determined by the encoding target code detection unit; (d) a decoding processing provision unit for providing a decoding unit for allocating a memory area for decoding the encoded encoding target codes and decoding the encoded encoding target codes in the allocated memory area into the execution program; and (e) a relocation processing provision unit for providing a relocation processing unit for relocating address information on the decoded encoding target codes in the execution program.

A sixth aspect of the present invention is an apparatus that generates an execution program of a type that includes the encoding target codes to be encoded in part of program codes thereof, the apparatus including: (a) a compiler for translating coded source program codes of high-level language format into object program codes; (b) an encoding target code detection unit for determining a range to be encoded in the coded program codes; (c) a relocation information generation unit for generating relocation information required to relocate address information on codes in the encoding target range determined by the encoding target code detection unit; (d) an encoding processing unit for encoding codes in the encoding target range determined by the encoding target code detection unit; (e) a decoding processing provision unit for providing a decoding unit for allocating a memory area for decoding the encoded encoding target codes and decoding the encoded encoding target codes in the allocated memory area into the execution program; and (f) a relocation processing provision unit for providing a relocation processing unit for relocating address information on the decoded encoding target codes based on the generated relocation information into the execution program.

In the execution program generation apparatuses according to the fifth and sixth aspects of the present invention, the encoding may be compression processing and the decoding may be decompression processing for the compressed data. Or the encoding may be encryption processing and the decoding may be decryption processing for the encrypted data.

The decoding unit and the relocation processing unit may be applied to the encoding target codes at the first execution of the encoding target codes after the execution program is loaded into the memory.

A seventh aspect of the present invention is a method for executing an execution program of a type that includes encoded encoding target codes in part of program codes thereof, the method including the steps of: (a) allocating the execution program on a memory space; (b) executing the execution program loaded into the memory; (c) before executing the encoding target codes, allocating a memory space for encoding the encoded encoding target codes and decoding the encoded encoding target codes on the allocated memory space; (d) performing relocation processing for the decoded encoding target codes; and (e) executing the decoded encoding target codes.

In the execution program execution method according to the seventh aspect of the present invention, the step (e) may be followed by a step (f) for discarding or deallocating the preallocated memory space including the decoded encoding target codes.

The encoding may be compression processing and the decoding may be decompression processing for compressed data. Or the encoding may be encryption processing and the decoding may be decryption processing for encrypted data.

The execution program includes a decoding execution flag indicating whether encoding target codes have been called again after being loaded into the memory, and may execute the decoding step (c) and the relocating step (d) according to the setting of the decoding execution flag.

An eighth aspect of the present invention is a computer-readable program storage medium that stores an execution program executable on a computer system in computer-readable form, the execution program including: (a) execution codes partially including encoded encoding target codes; (b) a program portion executable on the computer system, coded so as to allocate a memory area for decoding the encoded coding target codes and decode the encoded encoding target codes in the allocated memory area; and (c) a program portion executable on the computer system, coded so as to perform relocation processing for the decoded encoding target codes.

A ninth aspect of the present invention is a computer-readable program storage medium that stores an execution program executable on a computer system in computer-readable form, the execution program including: (a) execution codes partially including encoded encoding target codes; (b) relocation information about the encoding target codes; (c) a program portion executable on the computer system, coded so as to allocate a memory area for decoding the encoded coding target codes and decode the encoded encoding target codes in the allocated memory area; and (d) a program portion executable on the computer system, coded so as to perform relocation processing for the decoded encoding target codes based on the relocation information.

An execution program implementing the present invention includes encoded encoding target codes and other codes not encoded.

The execution program is designed so that, immediately before the encoding target codes are executed, they are decoded and relocated. This is achieved by including a decoding function for decoding the encoding target codes and a relocating function for performing relocation in the execution program.

To efficiently perform relocation processing, relocation information on the encoding target codes may be generated in advance so that it is appended to the execution program when encoded.

Immediately after the execution program is started, the encoding target codes are not decoded. When the program execution has proceeded to the stage in which to execute the encoding target codes, an area for decoding the encoding target codes is allocated not in a program code area but in a data memory area, and then the encoding target codes are decoded within the area to relocate relevant code portions. As a result of going through such a procedure, the program can be normally executed.

Although the foregoing description assumes that an encoded code area is decoded during execution on a type of operating system inhibiting the rewriting of program code areas, it goes without saying that the present invention can also be implemented on a type of operating system permitting the rewriting of program code areas. In this case, since program codes are decoded and executed within data areas, illegal use of programs by analysis and tampering can be more suitably prevented.

The characteristics and advantages of the present invention will become apparent by more detailed explanation based on the embodiments of the present invention described later and the accompanying drawings.

BRIEF DESCRIPTION OF THE DRAWINGS

Preferred embodiments of the present invention will be described in detail based on the followings, wherein:

FIG. 9 is a flowchart showing the procedure for executing the execution program in the second embodiment.

DESCRIPTION OF THE PREFERRED EMBODIMENTS

Program codes implementing the present invention are executable on, e.g., a general purpose computer system in which a proper operating system is installed. The general purpose computer system generally includes: a processor for executing program codes; a memory for loading program codes and temporarily storing work data; user input-output apparatuses such as a display and a keyboard; and external storage units such as a hard drive to provide nonvolatile storage for program files and data files. The specification does not provide further description for the configuration of the computer system because of departure from the scope of the present invention.

Hereinafter, a detailed description will be made of execution program codes implementing the present invention and the operating characteristics of the program codes on the computer system with reference to the accompany drawings.

<First embodiment>

When an execution file is compressed, the entire file is usually compressed at a time. However, for programs including routines that are large in size but are executed only occasionally, only the routines are partially compressed and are decoded for use only during execution. This method helps to omit unnecessary processing because decoding does not need to be performed when the routines are not executed. Also, by performing decoding the first time that data is reference, the same method can also be employed for programs having an enormous amount of data that is referenced only occasionally.

A first embodiment described herein is an example of partially compressing an execution program; a general purpose compiler can be used to compile the execution program.

Figure 1:
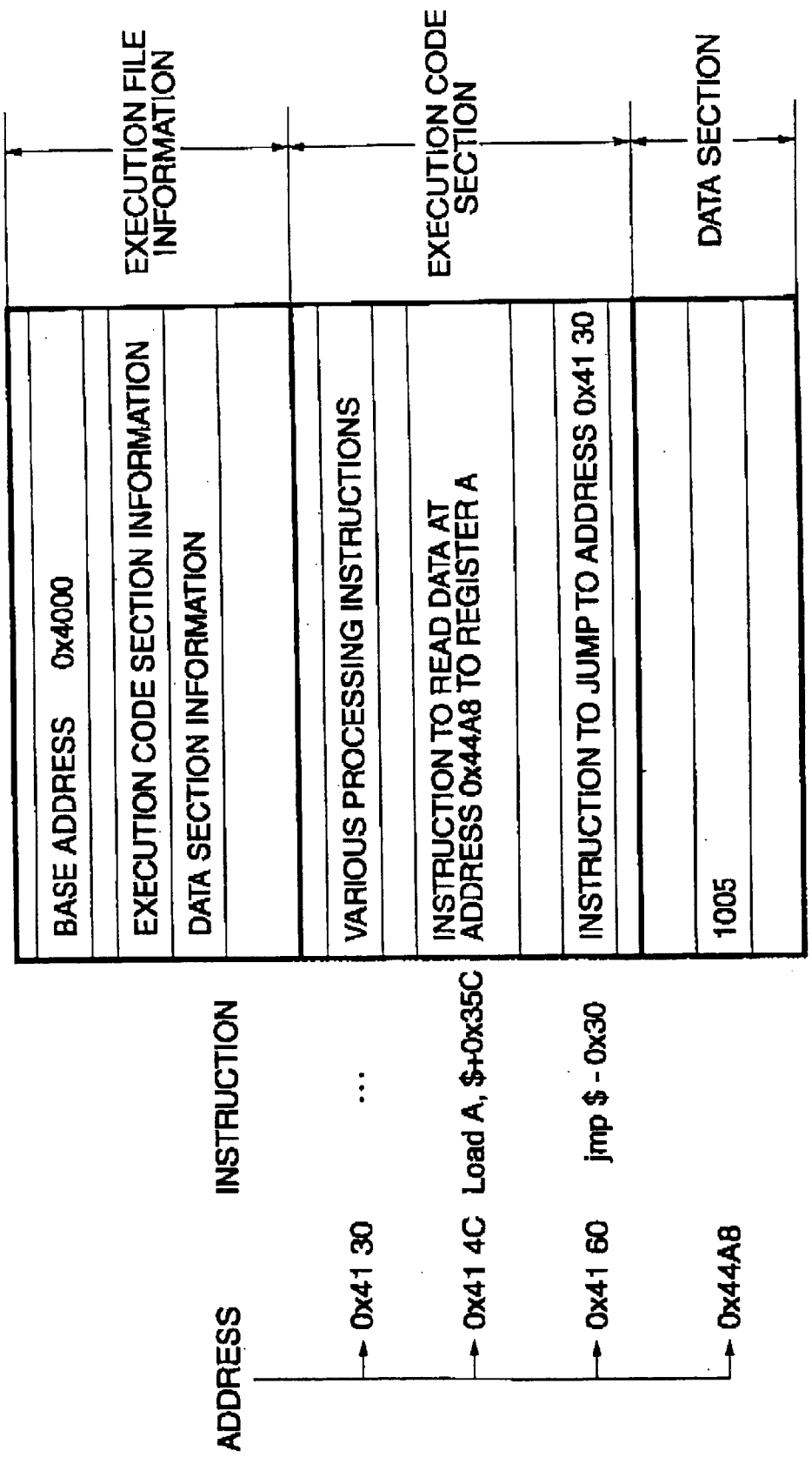
FIG. 1 is a conceptual diagram showing a memory image of an execution file.

FIG. 1 is a conceptual diagram of a code image of an execution program to which the first embodiment is applied.

As shown in the drawing, although the execution program has plural sections, to implement the present invention, it at least includes an execution code section containing execution codes.

The execution program of this embodiment also has execution file information and a data section.

The execution file information is a section storing a collection of file information items about the execution program and is placed at the start of the program. The execution file information includes an address (a base address assumed at compile time) at which the start of the execution program is to be loaded. In the examples of FIG. 1, a base address is allocated to 0x4000 in hexadecimal notation.

The execution file information holds information about sections such as the execution code section and the data section included in the program; that is, their recording position in the file, size, offset from the base address during allocation to a memory, and attribute information indicating whether they are writable or executable.

The data section is an area for storing data for which a storage area is statically allocated.

Codes of the execution code section include information for referencing the location of other information in the execution program as relative address information. In the example of FIG. 1, an instruction to read data from an absolute address 0x44A8 of the data section exits in an instruction (that is, an instruction loaded into an address 0x414C if the base address is 0x4000) having 0x14C as a relative address from the base address. The instruction includes, as relative address information, the difference (0x44A−0x414C=0x35C) between the address 0x414C at which the load instruction exists and the address 0x44A of a reference destination memory. An operation code indicating load as an instruction type is put at the address 0x414C and the relative address information is put in and after the address 0x414D.

In this way, even if a program represented by relative address information is loaded as a whole at different addresses, for example, even if a basic address is not 0x4000 but 0x5000 in the case of an execution program as shown in FIG. 1, since the relative position relationship between reference sources and destinations remains unchanged, the program can be executed without modifications. Therefore, if the operating system allocates another address area, e.g., 0x5000 when it cannot use the base address 0x4000 because another program already uses it, or for other reasons, program codes can be loaded for execution without modifications.

However, where only a portion of codes is allocated to a different address, if relative address information included in the code portion is not modified, the codes could not be normally executed. An example of this case occurs when a data memory area different from a program code area is allocated as an area for decoding an encoded code area.

By solving this problem, the present invention can provide a technique for normally executing program codes partially encoded. Hereinafter, the embodiment will be described in detail.

Figure 2:
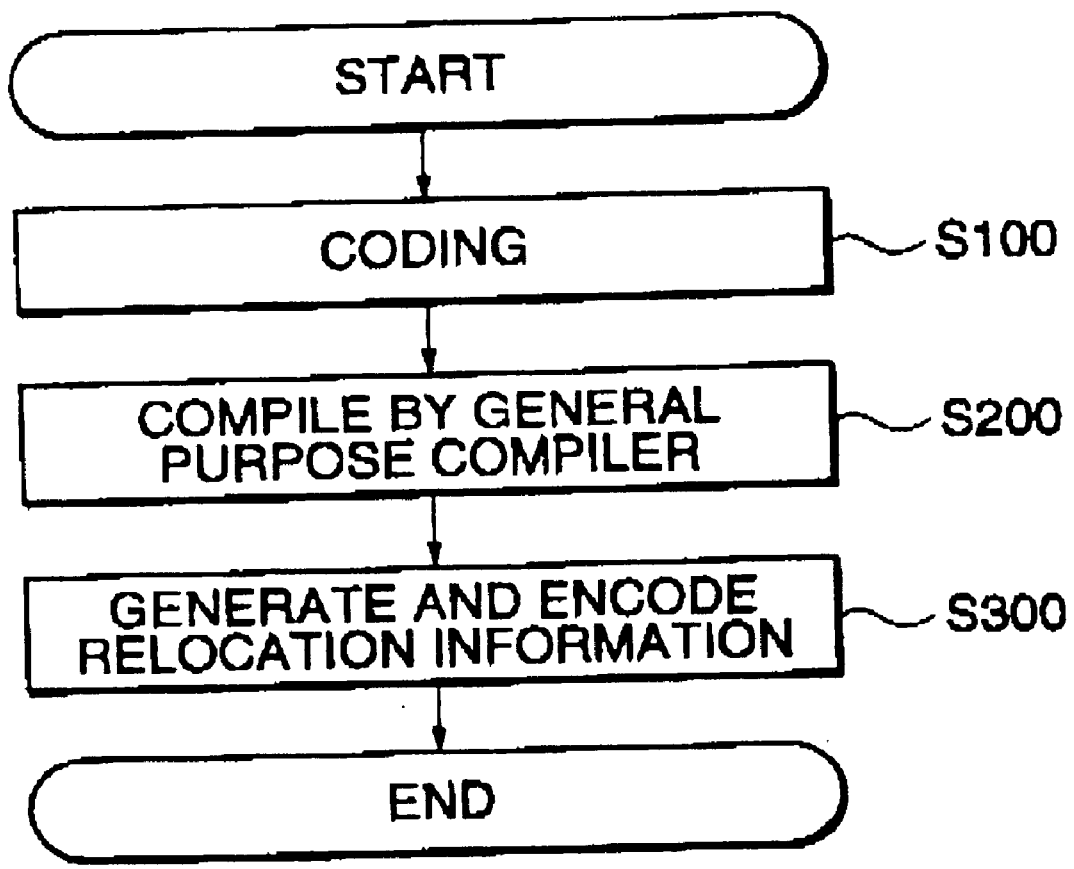
FIG. 2 is a flowchart for creating an execution program.

FIG. 2 is a flowchart showing the procedure for creating an execution program of the present invention. Individual steps are described below.

First, codes to be placed in an execution code section are created (coding) (step 100). The execution codes include encoding target codes, a decoding execution code for restoring encoded encoding target codes, and a relocation execution code for relocating the encoding target codes. The relocation execution code includes an area for storing relocation information.

The decoding execution code and the relocation execution code may be created in the form of function. These functions may be provided in the form of library created in advance. However, the function (temporarily referred to as a decoding function) to provide the decoding execution code must receive information about the range of decoding (that is, the range of encoding target codes) when the function is called. The function (temporarily referred to as a relocation function) to provide the relocation execution code must reference relocation information about encoding target codes when relocated after being decoded. Therefore, the relocation information must be specified at the calling of the function by the method of passing a pointer to the information or other methods.

The encoding target codes are a code portion to be subjected to encoding such as compression for the purpose of size reduction (described later). In implementation of the present invention, there is no special limitation on a method for decoding the range of encoding target codes to be encoded. However, in this embodiment, the encoding target codes are put at the end of the execution code section. They are put at the end of the execution code section to reduce the execution file. The execution codes are recorded on a file after they are shifted by the size of a space vacated by the compression. By placing the space vacated by the compression on the section boundary, shifting can be performed on a section basis. In other words, the amount of program rewriting can be minimized, compared with shifting in the middle of a section.

For a type of compiler that keeps a sequence relation of function definitions made on a source file also on execution codes, by defining functions having encoding target codes at the end of the source file, the encoding target codes can be put at the end of an execution code section. For other types of compilers, arrangements would have to be made to inhibit an optimization that might cause change a sequence relation of codes.

Before the first execution of encoding target codes after an execution program is loaded, the decoding function and the relocation function are executed. Specifically, a decoding execution flag indicating whether decoding has already been performed is provided in advance within the execution program. Before the encoding target codes are executed, the decoding execution flag is reference so that the decoding function and the relocation function are called only when decoding is not yet performed. The decoding execution flag should be initialized to a state indicating that decoding is not performed.

After a program has been created as described above (step 100), it is compiled to executable codes (step 200). A general purpose compiler can be used for the compiling without modifications. The compiling, which may do with conventional technologies, will not be further described. Finally, relocation information is generated and encoded (step 300).

Figure 3:
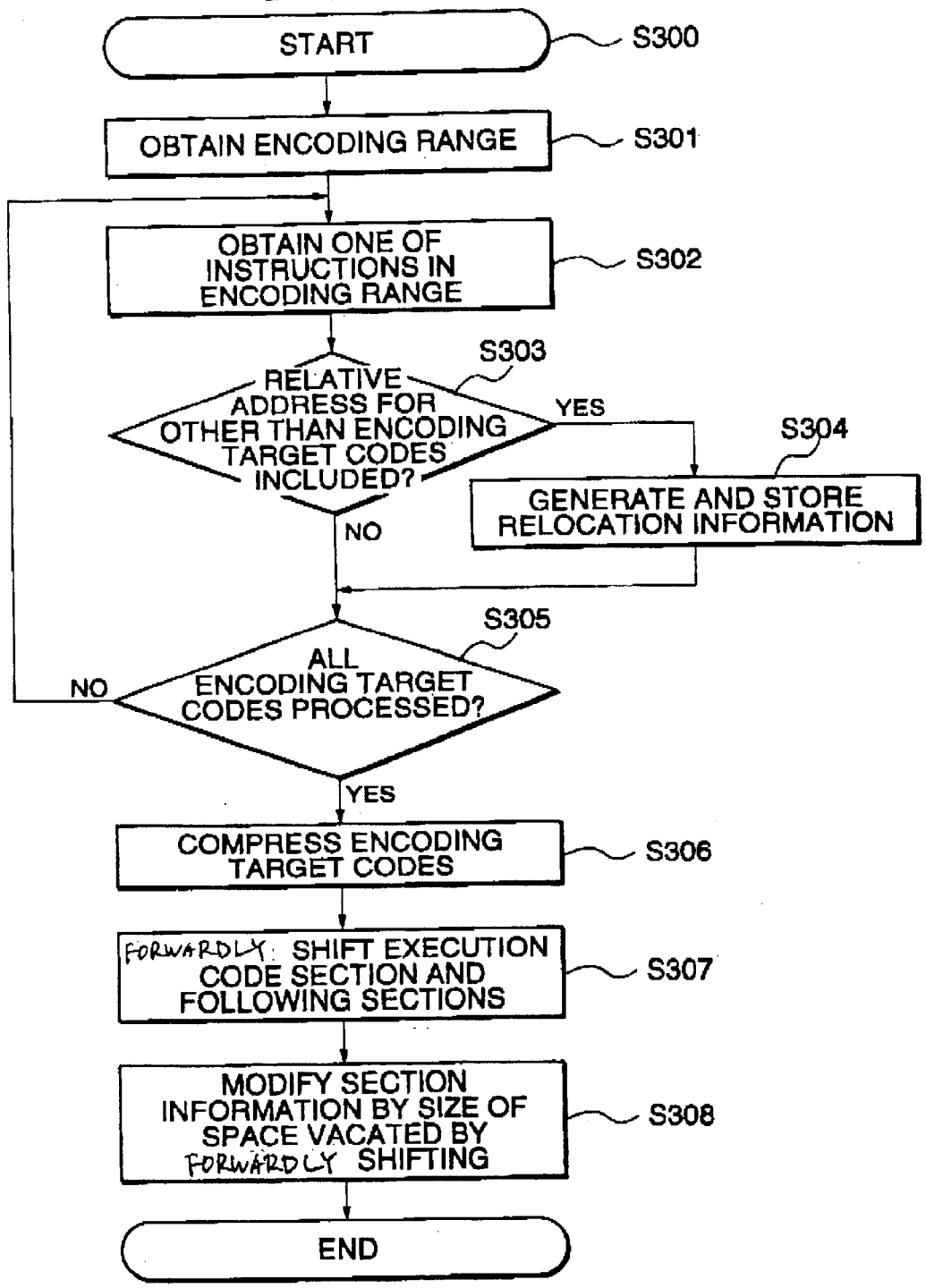
FIG. 3 is a flowchart showing a processing procedure for relocation information generation and encoding in a first embodiment.

FIG. 3 is a flowchart showing details of a processing procedure executed in step 300 of FIG. 2. Individual steps are described in detail.

The range of encoding target codes is obtained (step 301). In the first embodiment, the encoding target codes are at the end of the execution code section (as described above).

Next, relocation information is created for instructions within the range of encoding target codes. Specifically, instruction codes are read one at a time from the start of encoding target codes to determine its type (step 302) and it is determined whether the read instruction code includes relative address information beyond the encoding target code range (step 303). If such relative address information is included, relocation information about the relative address information is generated and is stored in a relocation information storage area in advance allocated within the data section (step 304). In other words, if the instruction code includes relative address information referenced within the encoding target code range, relocation information is not generated.

Relocation information may be an offset of an address position in which relative address information is included, from the start of the encoding target codes. For example, if the encoding target codes begin in 0x4140 and relative address information is included in 0x414D, the offset 0x000D is relocation information. The above processing is repeated for instruction codes of all encoding target codes (step 305).

Upon termination of the relocation information generation processing in step 304 for instruction codes of all encoding target codes, the encoding target codes are encoded in compressed form (step 306).

Since the area is vacated by the amount of compressed codes at the completion of the compressed encoding, to reduce file size, the execution code section and following sections are recorded in the file after being forwardly shifted by the size of a vacated area (step 307).

Since the section occupation locations are changed by step 307, the section start positions within the execution file, recorded as part of execution file information, are replaced by new values resulting from the forwardly shifting (step 308) and then the processing routine terminates.

Figure 4:
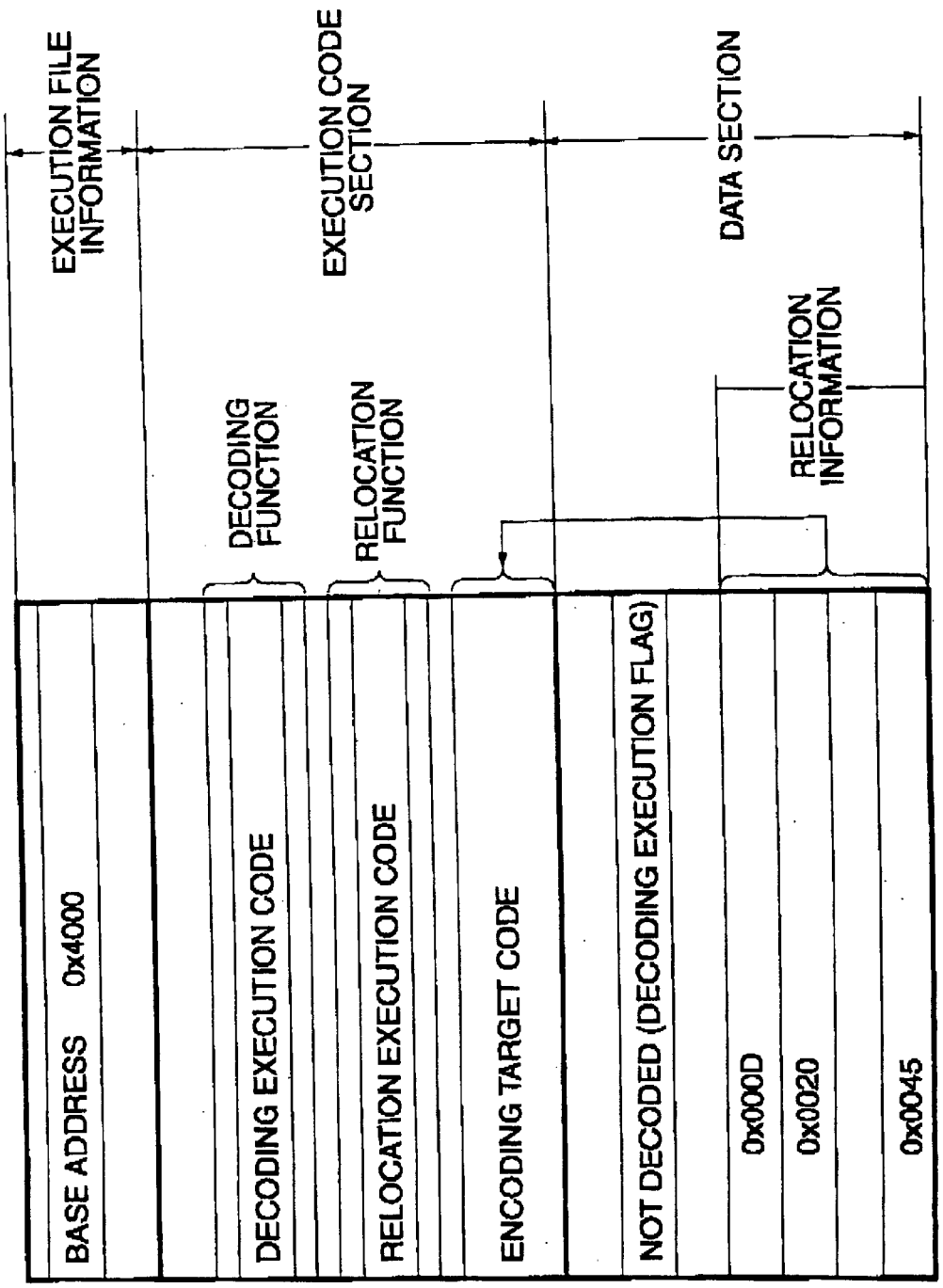
FIG. 4 is a schematic diagram showing the configuration of an execution file in the first embodiment.

According to the processing procedure shown in FIG. 3, the execution program file of the present embodiment is suitably created. FIG. 4 is a schematic diagram showing the configuration of the created execution program file, which includes an execution code section and a data section.

The data section stores the relocation information about the encoding target codes, generated by the above described processing.

The execution code section includes the encoding target codes encoded in compressed form, the decoding function including a decoding execution code, and the relocation function including a relocation execution code, wherein the encoding target codes are placed at the end of the code section. The execution program is configured to execute the decoding function and the relocation function before executing the encoding target codes.

The data section of the present embodiment contains a decoding execution flag indicating whether the encoding target codes have already been decoded.

In the present embodiment, in steps 302 to 305, instructions of the encoding target codes were analyzed one at a time to judge whether they include a relative address. With the common compilers of performing translation from a high-level language into machine codes, a processing module called a linker is configured to solve the address information, and the address information to be solved is generally included in an intermediate file passed to the linker module. Accordingly, instead of analyzing instructions of the encoding target codes one at a time, the intermediate file may be analyzed to generate relocation information.

Furthermore, in the present embodiment, as post-processing of the general purpose compiler, the modification of the relocation information and the compression of the encoding target codes were performed. However, the same function may be incorporated in the compiler so that a program with the same configuration as that in the present embodiment can be generated at the same time as compiling. This approach has the advantage of providing higher processing efficiency than the present embodiment because, when creating relocation information during compiling, final relocation information can be directly created by determining whether relative address information is included in the encoding target codes.

Next, a description is made of the procedure for executing an execution program created as described above.

A program loader, when loading the execution program, allocates a memory space into which to load the execution program, loads the program into the space, and starts execution.

Before executing encoding target codes, the decoding execution flag is referenced to determine whether the encoding target codes have already been decoded. If they have not yet been decoded, the decoding function and the relocation function are called and applied to the encoding target codes. The decoding function obtains the range of decoding, allocates a memory area capable of storing decoding results, and decodes the encoding target codes in the memory area. Furthermore, the relocation function relocates the decoded encoding target codes while referencing the relocation information. Relocation processing is practically performed as described below.

(1) Calculate the difference between the start address of the memory area in which decoding results are stored, and the start address of the area in which encoded codes are stored, and use the difference as a relocation offset.

(2) Perform processing described below, for all relocation information. Add the start address of the memory area in which the decoding results are stored, to an offset stored in the relocation information, add the relocation offset to relative address information stored in the address, and re-store the codes. Upon termination of the relocation processing, change the decoding flag to a decoding completion state. After the processing, decoded encoding target codes are executed.

When the encoding target codes are called a second time or later, by referencing the decoding execution flag indicating whether they have been decoded, it can be easily determined that they have been decoded. Accordingly, without executing the decoding function and the relocation function, the encoding target codes are immediately executed. Thereafter, program execution proceeds as in normal program execution.

It will be understood from the above description that the execution program of the present embodiment can be executed according to a normal program execution mechanism.

<Second embodiment>

The above described first embodiment applied the present invention to the compression of part of execution program codes. On the other hand, a second embodiment applies the present invention to the encryption of an execution program.

The procedure for creating an execution program in the present embodiment is the same as that in FIG. 2. That is, programming is performed in consideration of the codes to be encrypted in the program (step 100).

As one of the operations performed during programming, the encoding target codes to be encrypted are decided. The purpose of encrypting part of execution codes is to protect security information included in the codes. By in advance inserting a decoding execution code to decode the encoding target codes and a relocation execution code to relocate the encoding target codes into the execution code section, execution program codes are configured so that, before the encoding target codes are executed, they are decoded and the decoded portions are relocated.

To relocate the encoding target codes requires referencing relocation information about the encoding target codes. One method for allocating relocation information is to preallocate an area in the data section, as described in the first embodiment. As other methods, the relocation information may be allocated in another section (e.g., the execution code section and sections used for other purposes) loaded into the memory.

After a program has been created as described above, the program is compiled using a common compiler to an executable code system (step 200). For the compiled program, the generation and encoding of relocation information is performed (step 300).

Relocation information generation processing performed in step 300 can be performed according to the flowchart shown in FIG. 3 as in the first embodiment.

The range of encoding target codes is obtained (step 301).

Next, relocation information is created for instructions within the range of encoding target codes. Specifically, instruction codes are read one at a time from the start of encoding target codes to determine its type (step 302) and it is determined whether the real instruction code includes relative address information beyond the encoding target code range (step 303). If such relative address information is included, relocation information about the relative address information is generated and is stored in a relocation information storage area in advance allocated within the data section (step 304).

Relocation information may be an offset of an address position including relative address information from the start of the encoding target codes. For example, if the encoding target codes begin in 0×4140 and relative address information is included in 0×414D, the offset 0×000D is relocation information. The above processing is repeated for instruction codes of all encoding target codes (step 305).

Upon termination of the relocation information generation processing in step 304 for instruction codes of all encoding target codes, the encoding target codes are encrypted (step 306). Differently from the case of the first embodiment, which compresses codes, step 307 and 308 are not executed because the code size is not reduced by the encryption.

Figure 5:
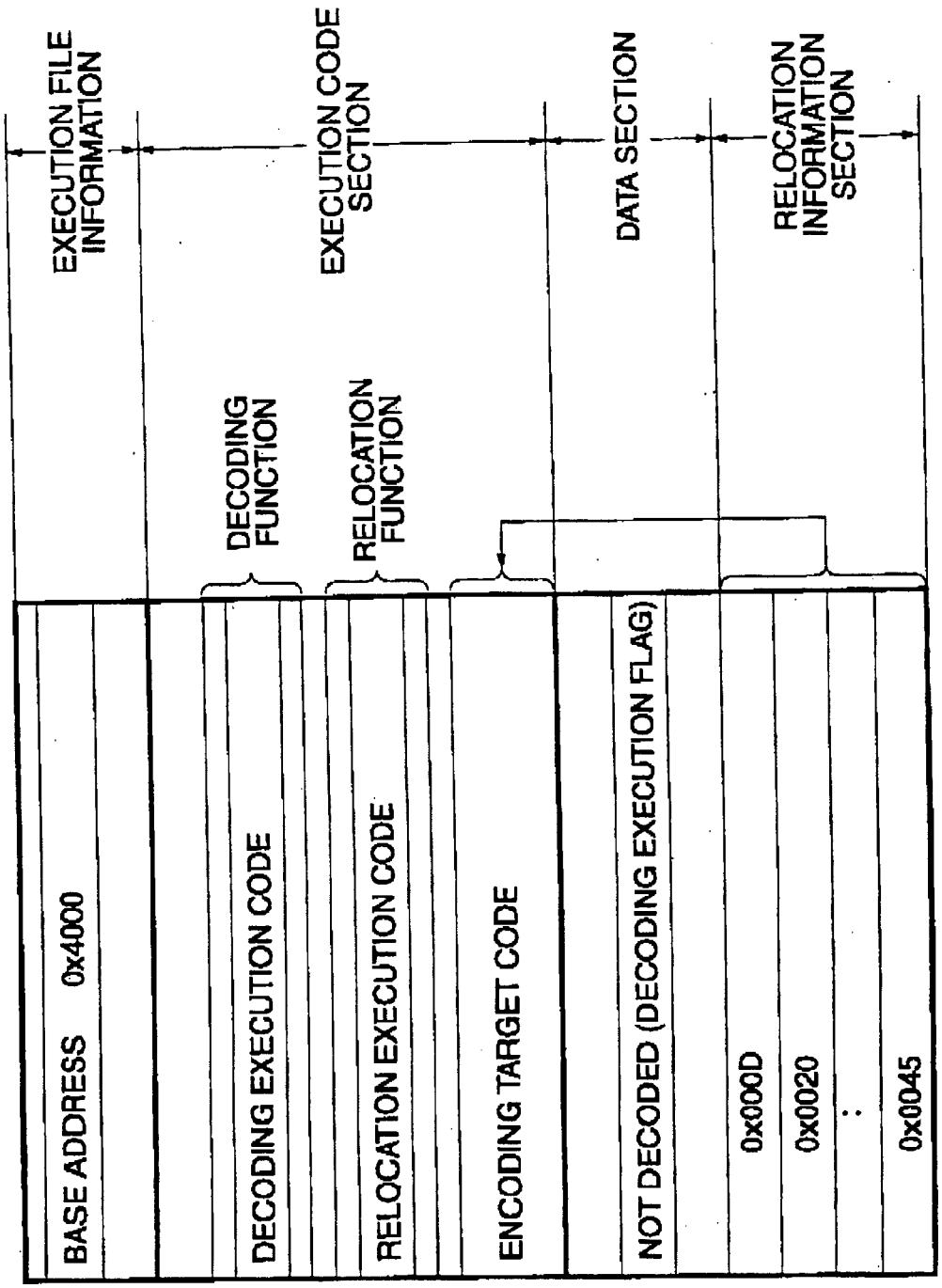
FIG. 5 is a schematic diagram showing the configuration of an execution file in a second embodiment.

FIG. 5 is a schematic diagram showing the configuration of the file of the execution program generated by different processing of the relocation information generation processing in step 300.

In this example, an area for storing relocation information described for the encoding target codes is allocated not within the data section but within a relocation information section specifically provided. Therefore, the execution file includes execution file information, the execution code section, the data section, and the relocation information section describing relocation information about encoding target codes.

The execution code section includes encrypted encoding target codes, a decoding execution code for allocating a memory area to store the codes to be decoded and decoding the encrypted codes before executing the encoding target codes, and a relocation execution code for relocating the decoded encoding target codes. Relocation information about the encoding target codes is stored in an area allocated within the data section or the relocation information section.

Next, a description is made of how the execution program of the present embodiment is executed.

A program loader allocates a memory area for loading the execution program and loads the program into the area.

After being loaded, the program is executed. Before executing the portion of encoding target codes, by applying the decoding execution code, a memory area for storing decoded codes is allocated, the encoding target codes are decoded in the area, and then the decoded encoding target codes are relocated by referencing relocation information about the decoded encoding target codes.

After the decoded codes are executed, the codes may be discarded and the allocated memory area may be deallocated. In this case, a discard execution code for clearing and deallocating the memory area in which the decoded codes are stored must be included in the execution codes. By discarding the decoded codes, more powerful protection can be provided for code security.

It will be understood from the above description that the execution program of the present embodiment can be executed according to a normal program execution mechanism.

Figure 6:
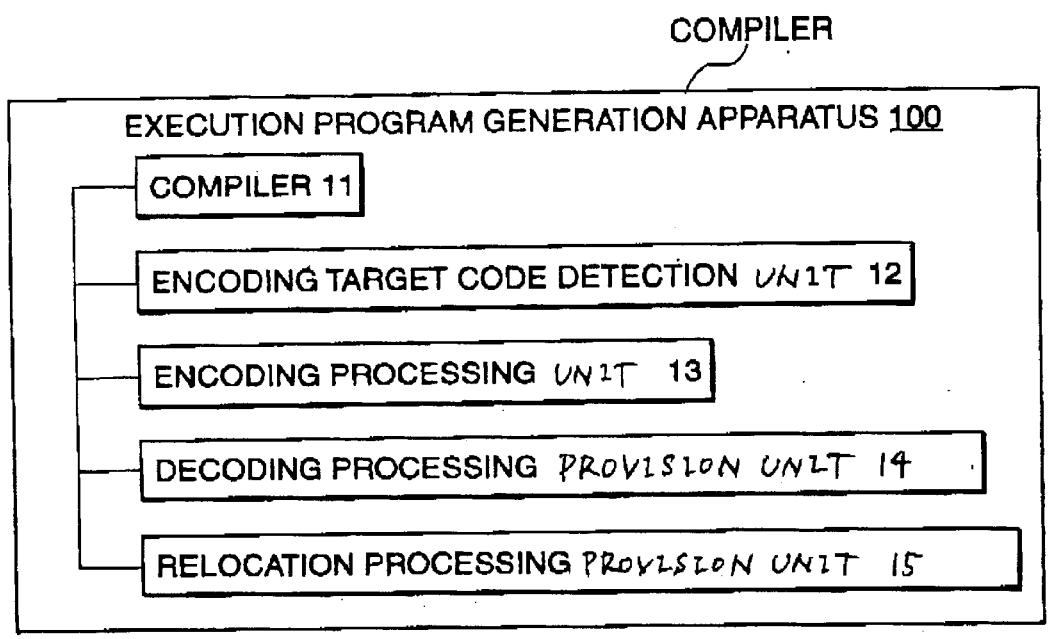
FIG. 6 is a conceptual diagram of an execution program generation apparatus that can implement the present invention.

FIG. 6 is a schematic diagram showing the configuration of an execution program generation apparatus 100 that can suitably generate the execution program of the first or second embodiment.

As shown in FIG. 6, the execution program generation apparatus 100 includes: a compiler 11; an encoding target code detection apparatus 12; an encoding processing unit 13; a decoding processing provision unit 14; and a relocation processing provision unit 15. The entity of the execution program generation apparatus 100 is a general purpose computer system in which software programs to implement the same function are installed.

The compiler 11 translates coded source program codes of high-level language format into object program codes. As already described, the compiler 11 may be a general purpose compiler presently in widespread use.

The encoding target code detection unit 12 specifies the range of coded program codes to be encoded (compressed or encrypted). A specification method is optional.

The encoding processing unit 13 encodes codes in an encoding target range specified by the encoding target code detection unit 12. An encoding method, that is, compression or encryption method employed in the encoding processing unit 13 is out of the question in implementation of the present invention.

The decoding processing provision unit 14 incorporates a decoding unit for decoding encoded encoding target codes before executing them in the execution program. The decoding herein, which refers to the decoding execution code and the decoding function in the above described embodiment, allocates a memory area for storing decoded codes when executing encoding target codes, and then decompressing or decoding the encoded codes in the allocated memory area. The decoding execution code is inserted in the execution code section like the encoding target codes.

The relocation processing provision unit 15 incorporates a relocation processing unit for relocating relative address information about decoded encoding target codes in the execution program. The relocation processing herein refers to the relocation execution code and the relocation function in the above described embodiment. The relocation processing is, during execution of encoding target codes, applied to encoding target codes having been decoded by applying the decoding execution code.

In the present embodiment, as post-processing of the general-purpose compiler, the modification of the relocation information and the compression of encryption of encoding target codes are performed. However, the same function may be incorporated in the compiler so that a program with the same configuration and effect as that in the above described embodiment cam be generated at the same time as compiling. This approach would provide higher processing efficiency than the above described embodiment because, when solving address information during compiling, relocation information can be directly created by determining whether address information is included in the encoding target codes.

<Third embodiment>

Next, a third embodiment is described. The present embodiment, without using relocation information of the above described first and second embodiments, determines, during program execution, whether relocation is necessary, before performing relocation. Although the present embodiment is lower in execution program execution efficiency than the first and second embodiments, the configuration of the execution program generation apparatus can be simplified. Herein, the case of encrypting part of program codes as in the second embodiment is described using an example.

The procedure for creating an execution program in the present embodiment is the same as that of FIG. 2. That is, programming is performed considering the codes to be encrypted in the program (step 100).

Like the second embodiment, as a programming operation, the encoding target codes to be encrypted are decided. Moreover, by in advance inserting a decoding execution code to decode the encoding target codes and a relocation execution code to relocate the encoding target codes into the execution code section, execution program codes are configured so that, before the encoding target codes are executed, they are decoded and the decoded portions are relocated.

Relocation processing for the encoding target codes is different from that in the second embodiment. That is, in the second embodiment, it was necessary to reference relocation information about the encoding target codes, while, in the present embodiment, it is determined whether relocation is necessary, before performing relocation processing. Therefore, an area for storing relocation information need not be preallocated.

After a program has been created as described above, the program is compiled using a common compiler to an executable code system (step 200).

Thereafter, for the compiled program, the generation and encoding of relocation information is performed (step 300). In the present embodiment, in step 300, only the encryption of the encoding target codes is performed.

Figure 7:
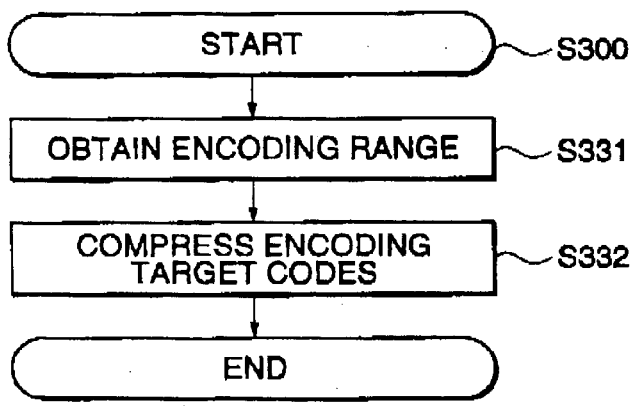
FIG. 7 is a flowchart showing a processing procedure for relocation information generation and encoding in a third embodiment.

Processing performed in step 300 is considerably simplified as shown in the flowchart of FIG. 7. That is, an encoding range is obtained (step 331) and the encoding target codes are compressed (step 332).

Figure 8:
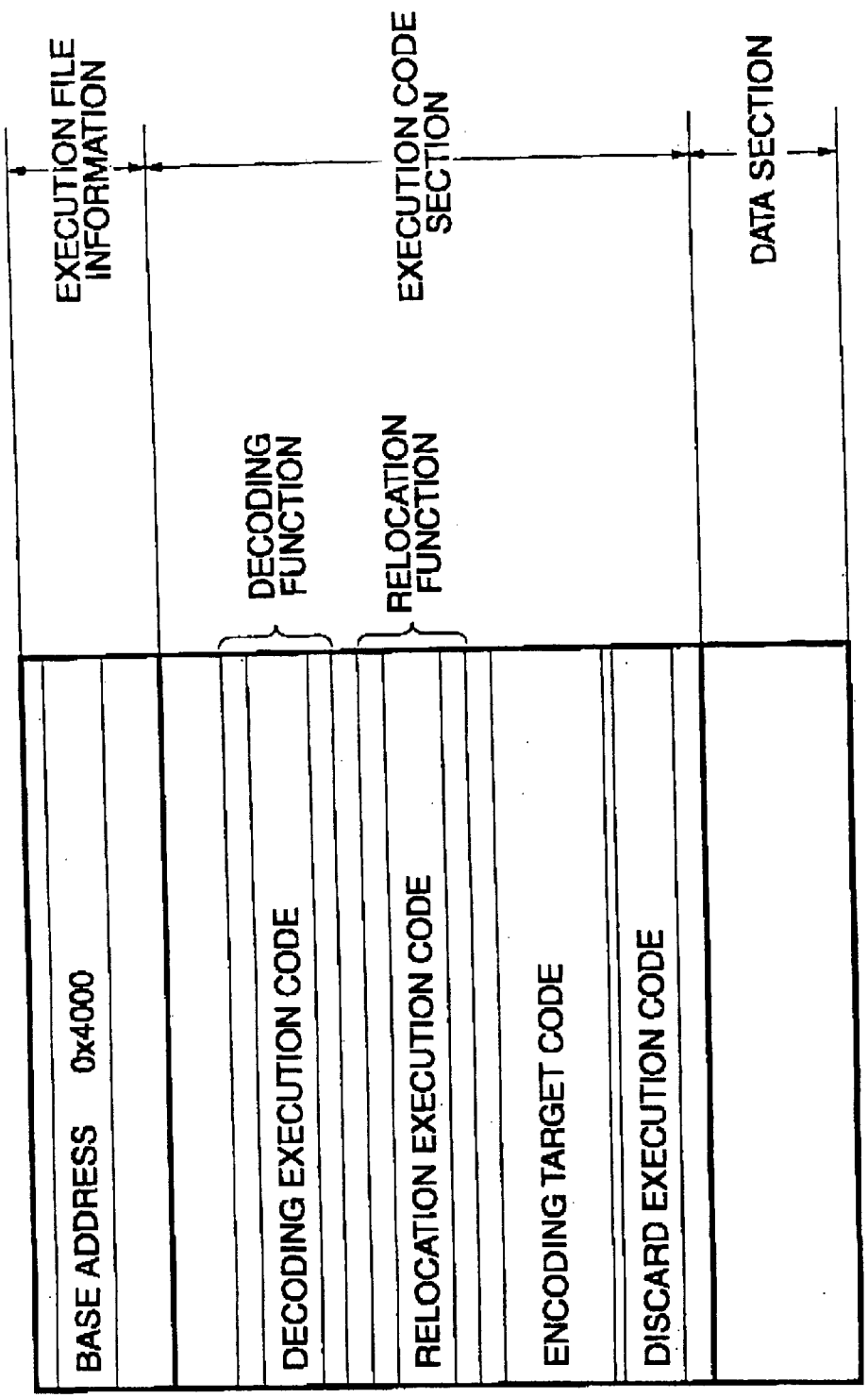
FIG. 8 is a schematic diagram showing the file configuration of an execution program generated by the third embodiment.

FIG. 8 is a schematic diagram showing the configuration of the file of the execution program generated by in the above described step 300. The execution program file includes execution file information, an execution code section, and a data section.

The execution code section includes encrypted encoding target codes, a decoding execution code for allocating a memory area to store the codes to be decoded and decoding the encrypted codes before executing the encoding target codes, a relocation execution code for relocating decoded encoding target codes, and a discard execution cord for discarding the decoded execution cord.

Next, a description is made of how the execution program of the present embodiment is executed.

A program loader allocates a memory area for loading the execution program and loads the program into the area. After being loaded, the program is executed.

Codes other than encoding target codes are ordinarily executed. When the portion of encoding target codes, the decoding execution code, the relocation execution code, and the discard execution code which are included in the execution codes are executed to execute the encoding target codes. The processing procedure is described according to the flowchart of FIG. 9.

A memory area for storing decoded codes is allocated by applying the decoding execution code (step 401).

Next, the encoding target codes are decoded in the area (step 402). Thereafter, relocation processing is performed for the decoded encoding target codes (decoded code) by the relocation execution code (steps 403 to 406).

Only one of instructions of the decoded codes is obtained (step 403), and it is determined whether the code includes relative address information for other than the encoding target codes (step 404). If the code includes relative address information for other than the encoding target codes, the relative address information is modified (relocation processing) (step 405). The processing performed for all decoded codes (step 406).

Upon termination of the above processing, the decoded codes are executed (step 407), and then the decoded codes and the memory area storing the decoded codes are discarded (or deallocated) (step 408).

The relocation processing in step 405 is described below in more detail.

In advance, calculate the difference between the start address of the memory area in which decoding results are stored, and the start address of the area in which encoded codes are stored, and hold the difference as a relocation offset (executed in step 401). In step 405, add the relocation offset to the relative address information of an instruction being processed and re-store the instruction.

It will be understood that the execution program of the present embodiment can be executed on a normal program execution mechanism according to the above described processing procedure.

Although the present embodiment has been described on the assumption that encoded code areas are decoded during execution on a type of operating system inhibiting the rewriting of program code areas, it goes without saying that the present invention can be implemented on a type of operating system permitting the rewriting of program code areas. In this case, since program codes are decoded and executed within data areas, illegal use of programs by analysis and tampering can be more suitable prevented.

As has been described, according to the present invention, an excellent execution program relocation technique can be provided which enables execution programs including encoded code portions and configured so as not to be decoded until their execution is required to be generated on a type of operating system not permitting the rewriting of program codes.

According to the present invention, an excellent execution program relocation technique can be provided which enables execution programs including encoded code portions and configured so as not to be decoded until their execution is required to be normally executed with the encoded code portions decoded after being started on a type of operating system not permitting the rewriting of program codes.

According to the present invention, an excellent execution program relocation technique can be provided which enables execution programs including encoded code portions and configured so as not to be decoded until their execution is required to be generated using general purpose compilers.

Although the invention has been described in its preferred form with a certain degree of particularity, it is understood that the present disclosure of the preferred form has been changed in the details of construction and the combination and arrangements of parts may be resorted to without departing from the spirit and the scope of the invention as hereinafter claimed.

What is claimed is:

1. A method for generating an execution program of a type that includes encoding target code to be encoded in part of program code thereof, the method comprising:
   (a) encoding the encoding target code as part of the execution program;
   (b) including a decoding execution code portion for allocating a memory area for decoding the encoded encoding target code into executable code and decoding the encoded encoding target code in the allocated area to the execution program; and
   (c) including a relocation execution code portion for performing relocation processing for the decoded encoding target code to the execution program.

2. A method for generating an execution program of a type that includes encoding target code to be encoded in part of program code thereof, the method comprising:
   (a) generating relocation information of the encoding target code;
   (b) encoding the encoding target code as part of the execution program;
   (c) allocating a memory area for decoding the encoded encoding target code into executable code and providing a decoding execution code portion for decoding the encoded encoding target code in the allocated area to the execution program; and
   (d) including a relocation execution code portion for relocating the decoded encoding target code using the generated relocation information to the execution program.

3. The execution program generation method according to claim 1, wherein the encoding is compression processing and the decoding is decompression processing for compressed data.

4. The execution program generation method according to claim 1, wherein the encoding is encryption processing and the decoding is decryption processing for encrypted data.

5. A method for generating an execution program of a type that includes encoding target code to be subjected to compression processing in part of an execution code section thereof, the method comprising:
   (a) compressing the encoding target code, the encoding target code being part of the execution program;
   (b) forwardly shifting an area of the execution code section and following sections by the size of a space vacated by compressing the encoding target code;
   (c) including a decoding execution code portion for allocating a memory area for decompressing the compressed encoding target code into executable code and decompressing the compressed encoding target code in the allocated area to the execution program; and
   (d) inserting a relocation execution code portion for performing relocation processing for the decoded encoding target code to the execution code section.

6. A method for generating an execution program of a type that includes encoding target code to be subjected to compression processing in part of an execution code section thereof, the method comprising:
   (a) generating relocation information of the encoding target code;
   (b) compressing the encoding target code, the encoding target code being part of the execution program;
   (c) forwardly shifting an area of the execution code section and following sections by the size of an area vacated by compressing the encoding target code;
   (d) including a decoding execution code portion for allocating a memory area for decompressing the compressed encoding target code into executable code and decompressing the compressed encoding target code in the allocated area to the execution program; and
   (e) inserting a relocation execution code portion for performing relocation processing for the decoded encoding target code using the generated relocation information to the execution code section.

7. The execution program generation method according to claim 1, wherein the decoding execution code portion and the relocation execution code portions are applied to the encoding target code at first execution of the encoding target code after the execution program is loaded into the memory.

8. An apparatus that generates an execution program of a type that includes encoding target code to be encoded in part of program code thereof, the apparatus comprising:
   (a) a compiler that translates coded source program code of a high-level language format into object program code;
   (b) encoding target code detection means for determining a range to be encoded in the coded source program code;

(c) encoding processing means for encoding code in the range to be encoded determined by the encoding target code detection means;

(d) decoding processing provision means for providing decoding means for allocating a memory area for decoding the encoded encoding target code into executable code and decoding the encoded encoding target code in the allocated memory area into the execution program; and (e) a relocation processing provision means for providing relocation processing means for relocating address information on the decoded encoding target code into the execution program.

9. An apparatus that generates an execution program of a type that includes encoding target code to be encoded in part of program code thereof, the apparatus comprising:

(a) a compiler that translates coded source program code of a high-level language format into object program code;

(b) encoding target code detection means for determining a range to be encoded in the coded source program code;

(c) relocation information generation means for generating relocation information required to relocate address information on code in the range to be encoded determined by the encoding target code detection means;

(d) encoding processing means for encoding code in the range to be encoded determined by the encoding target code detection means;

(e) decoding processing provision means for providing decoding means for allocating a memory area for decoding the encoded encoding target code into executable code and decoding the encoded encoding target code in the allocated memory area into the execution program; and (f) relocation processing provision means for providing relocation processing means for relocating address information on the decoded encoding target code based on the generated relocation information into the execution program.

10. The execution program generation apparatus according to claim 8, wherein the encoding is compression processing and the decoding is decompression processing for compressed data.

11. The execution program generation apparatus according to claim 8, wherein the encoding is encryption processing and the decoding is decryption processing for encrypted data.

12. The execution program generated apparatus according to claim 8, wherein the decoding means and the relocation processing means are applied to the encoding target code at first execution of the encoding target code after the execution program is loaded into the memory.

13. A method for executing an execution program of a type that includes encoded encoding target code in part of program code thereof, the method comprising:

(a) allocating the execution program on a memory area;

(b) executing the execution program loaded into the memory;

(c) before executing the encoding target code, allocating a memory area for decoding the encoding target code into executable code and decoding the encoded encoding target code on the allocated memory area;

(d) performing relocation processing for the decoded encoding target code; and (e) executing the decoded encoding target code.

14. The execution program execution method according to claim 13, after the step (e) for executing the decoded encoding target code, further comprising:

(f) discarding or deallocating the allocated memory area including the decoded encoding target code.

15. The execution program generation apparatus according to claim 13, wherein the encoding is compression processing and the decoding is decompression processing for compressed data.

16. The execution program generation apparatus according to claim 13, wherein the encoding is encryption processing and the decoding is decryption processing for encrypted data.

17. The execution program generation method according to claim 13, wherein the execution program includes a decoding execution flag indicating whether encoding target code has been called after being loaded into the memory, and executes the decoding step (c) and the relocating step (d) according to the setting of the decoding execution flag.

18. A computer-readable program storage medium that stores an execution program executable on a computer system in a computer-readable form, the execution program comprising:

(a) execution code partially including encoded encoding target code;

(b) a program portion, executable on the computer system, that allocates a memory area for decoding the encoded coding target code and that decodes the encoded encoding target code into executable code in the allocated memory area; and (c) a program portion, executable on the computer system, that performs relocation processing for the decoded encoding target code.

19. A computer-readable program storage medium that stores an execution program executable on a computer system in a computer-readable form, the execution program comprising:

(a) execution code partially including encoded encoding target code;

(b) relocation information about the encoding target code;

(c) a program portion, executable on the computer system, that allocates a memory area for decoding the encoded coding target code into executable code and that decodes the encoded encoding target code in the allocated memory area; and (d) a program portion, executable on the computer system, that performs relocation processing for the decoded encoding target code based on the relocation information.

20. The execution program generation method according to claim 1, wherein:

including the decoding execution code portion for allocating a memory area comprises including a decoding portion on a same medium where the encoded encoding target code resides, the decoding portion allocating a memory area that is different from a memory area in which the execution program is initially loaded; and including the relocation execution code portion for performing relocation processing comprises including a relocating portion on a same medium where the encoded encoding target codes resides, the relocating portion generating relocation information, the relocation information including an offset address position from a start of the encoding target code.

* * * * *